Oct. 26, 1965 R. D. BREMER 3,213,522
DOMESTIC APPLIANCE
Original Filed Sept. 17, 1959 2 Sheets-Sheet 1

INVENTOR.
Robert D. Bremer
BY
Frederick M. Ritchie
His Attorney

Oct. 26, 1965  R. D. BREMER  3,213,522
DOMESTIC APPLIANCE
Original Filed Sept. 17, 1959  2 Sheets-Sheet 2

INVENTOR.
Robert D. Bremer
BY Frederick M. Ritchie
His Attorney

United States Patent Office 3,213,522
Patented Oct. 26, 1965

3,213,522
DOMESTIC APPLIANCE
Robert D. Bremer, Dayton, Ohio, assignor to General Motors Corporation, Detroit, Mich., a corporation of Delaware
Original application Sept. 17, 1959, Ser. No. 840,715, now Patent No. 3,110,795, dated Nov. 12, 1963. Divided and this application Nov. 28, 1962, Ser. No. 240,623
3 Claims. (Cl. 29—155.63)

This invention relates to a domestic appliance and more particularly to an improved method of forming a solid plate cooking unit. This is a division of my copending application Serial No. 840,715 filed September 17, 1959, now Patent 3,110,795 issued November 12, 1963.

The art of electric cooking has long sought a surface cooking unit which is durable, pleasing in appearance, easy to clean, and able to transmit heat quickly from the electrical resistance element to the cooking utensil or pan. The solid plate cooking unit has been recognized especially for its durability and for its ease of cleaning. However, the early attempts at developing a solid plate cooking unit were unsatisfactory in that the unit was slow to heat and, with its profuse use in ceramics, was anything but durable. In the past, it was necessary to embed an open resistance coil in a channel of powdered dielectric to protect the coil from the exposed plate. This dielectric packing eliminated the hazard of shock but it also slowed the speed with which the unit heated and tended to crack and dislodge with age. Thus, the electric cooking art turned from the earlier type solid plate heaters to the tubular sheathed spirally formed elements now in use. Although the spiral tubular elements provide rapid heat-up they lack even heat distribution and the convolutions thereof are difficult to clean. This invention is directed to combining the best attributes of the spiral tubular element into an improved solid plate heater or cooking unit.

Accordingly, it is an object of this invention to provide a composite solid plate heater having a source of heat therefor sandwiched between cast top and bottom members.

It is a further object of this invention to provide a method of forming a solid plate cooking unit wherein the plate forming members are cast separately from and prior to their receiving the tubular heating element.

A further object of this invention is the provision for using a high temperature stainless brazing process for intimately bonding a heating element to a solid plate cooking unit casting.

Another object of this invention is the provision of a solid plate cooking unit having complementary top and bottom castings to retain a heating element therefor in sandwiched relationship.

A still further object of this invention is the provision of a solid plate cooking unit which may be reversible.

An additional object of this invention is the provision of a method of forming a composite solid plate cooking unit whereby the separate members thereof may be bonded in a normal atmosphere furnace.

Further objects and advantages of the present invention will be apparent from the following description, reference being had to the accompanying drawings wherein preferred embodiments of the present invention are clearly shown.

Figure 1:
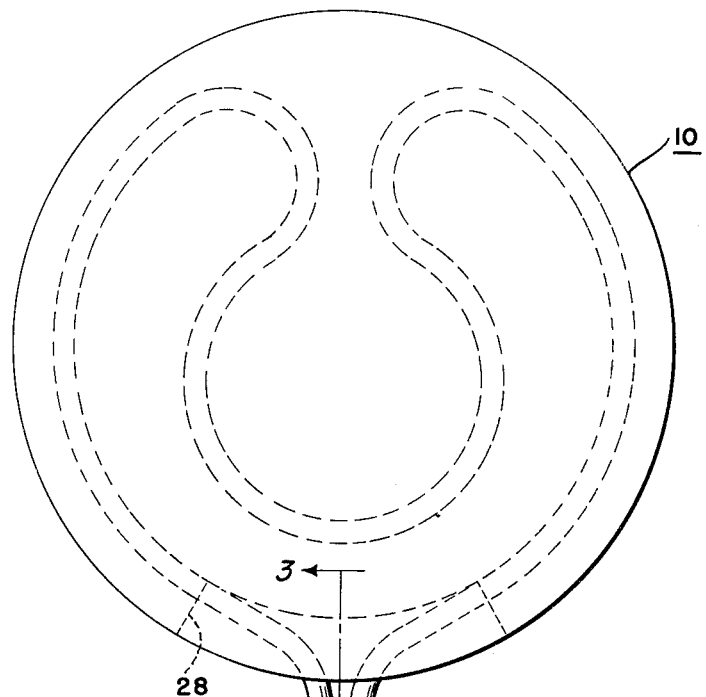
FIGURE 1 is a top elevational view of a solid plate cooking unit designed in accordance with the concepts of this invention.
Figure 3:
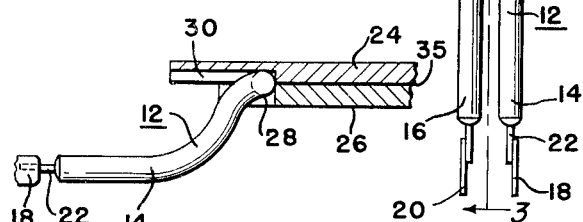
FIGURE 3 is a fragmentary side sectional view taken along line 3—3 in FIGURE 1 showing the disposition of the heating element terminal ends.

In accordance with this invention and with reference to FIGURE 1, a solid plate cooking unit or heater 10 is shown in top elevation. The cooking unit 10 has a generally circular configuration and is comprised of a top plate portion 24 and a bottom plate portion 26. The cooking unit 10 derives its source of heat from a tubular heating element 12 which is retained partially within the cooking unit in a sandwiched relationship. The heating element 12 has end portions 14 and 16 protruding from the cooking unit 10. The heating element 12 is also formed with a stainless steel tubular outer casing which serves as a housing for a resistance wire, the terminal ends 22 of which are exposed. A dielectric material such as magnesium oxide spaces the wire from the tubular casing. The terminal ends 22 of the resistance wire extend slightly from the end of the casing and have welded thereto spade or electrical connector members 18 and 20. The utilization of the cooking unit 10 is intended for electric range application at an approximate operating temperature of 1000° F., and the connecting spades 18 and 20 are adapted to be connected to any conventional terminal block (not shown) disposed adjacent the periphery of a range top opening for receiving the unit. The cooking unit 10 may be controlled in the same manner by which the present-day spirally formed tubular units are controlled. Namely, control may be effected through a temperature responsive arrangement whereby the power supply to the heating element 12 is proportioned in a given time interval in accordance with a user's temperature selection on an infinite heat switch.

Figure 2:
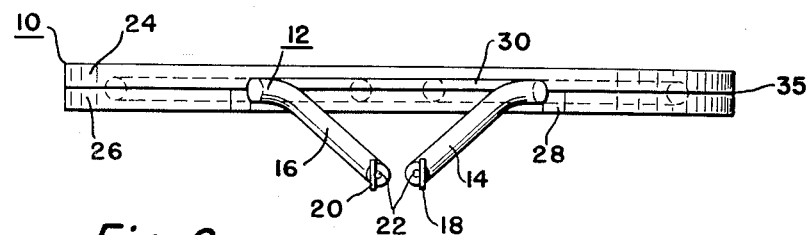
FIGURE 2 is a side elevational view of the solid plate cooking unit seen in FIGURE 1.
Figure 4:
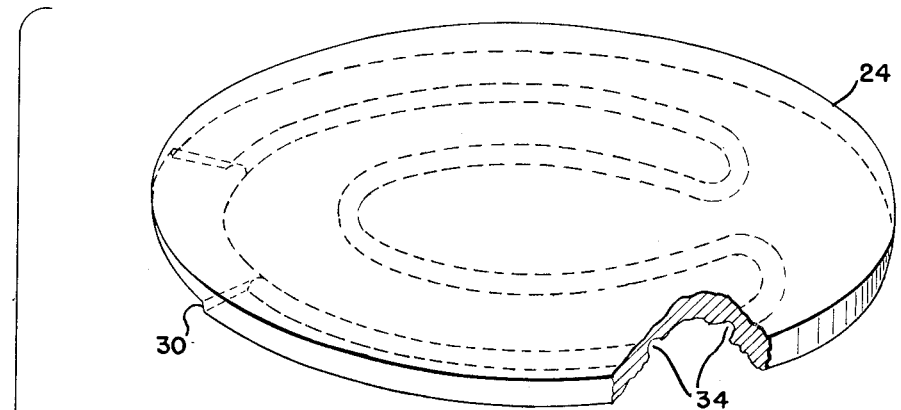
FIGURE 4 is an exploded view of the solid plate cooking unit of this invention with one portion being broken away to show a heating element retaining groove.
Figure 4:
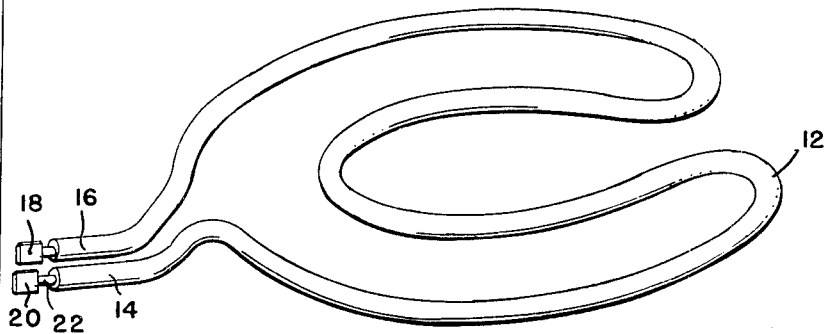
Figure 4:
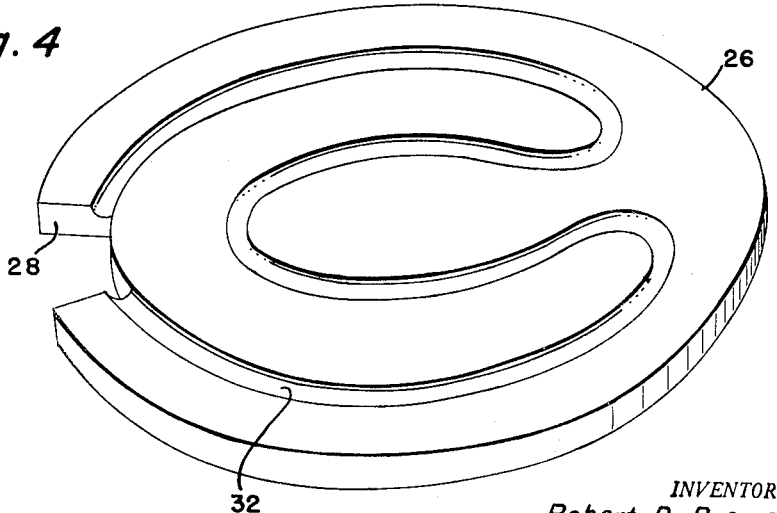

More particularly and with reference to FIGURES 2 and 4, the solid plate cooking unit 10 is shown comprised of an upper or top plate member 24 and a lower or bottom plate member 26. Disposed between the top and bottom members is the heating element 12. It will be noted that the bottom member 26 is formed or cast with a notch or open portion 28 at one point along its periphery to allow the terminal ends 14 and 16 of the heating element to project outwardly from between the solid plates 24 and 26. For a similar reason, the top plate 24 may be formed or cast with a notch or recess 30 to facilitate a straight generally radially outward projection of the heating element ends 14 and 16 as will be described hereinafter for a reversible unit 10. It should be recognized, however, that the notch 30 may be eliminated in the arrangement of the drawings where the end portions 14 and 16 of the heating element offset downwardly immediately.

For receiving the tubular heating element 12, the bottom plate 26 is cast with a groove 32 which is irregular in conformance with the shape of the bottom half of the heating element 12. Likewise, a groove 34 is cast into the upper plate member 24 for receiving the top half of the heating element 12. Note that the grooves 32 and 34 are shaped to confine and conform to the outer sheath of the heating element 12, allowing only for a bonding material 35 between adjacent members to intimately unit these members as will be described more fully hereinafter.

The method by which the improved solid plate heater may be manufactured will now be described. The method comprises a first step whereby two similar plates 24 and 26 are cast of a good grade of cast iron. In this way, a homogeneous casting results which is free of impurities. Of course, it is possible that other materials than iron such as cast stainless steel, may provide the requirements of durability and rapid heat transfer essential to solid plate construction. But the wide range of operating temperatures for the unit 10 dictates that the plates 24 and 26 be formed of materials having the same coefficient of thermal expansion. In this way warpage of the cooking unit at high temperatures is eliminated. The casting procedure should form the grooves 32 and 34 as well as the notches 28 and 30 in these castings. It should be recognized that the casting process for the simple disc-like plates 24 and 26 is a simple problem since no heating element is joined with or embedded in the plate during the casting process. Further, the fact that the top and bottom castings 24 and 26 for the cooking unit 10 are unencumbered with attached or embedded elements permits the castings to be handled in any manner and treated to any process without the additional concern for the attached element. For instance, these castings could be handled roughly in large quantities and may be plated or surface-treated in any manner suitable to the single material forming the casting. Although the castings may be sized to any desired form suitable for use with an electric range, it has been found that a six or eight inch diameter plate such as 24 or 26 having a quarter inch thickness and defining therein grooves having a three sixty-fourths inch radius is suitable for use in the practice of this invention. The meandering configuration of the grooves 32 and 34 is such as to provide the most effective heat distribution of the heating element within the outer limits of the casting. Thus, for differently sized castings, the meandering or longitudinal configuration of the grooves may necessarily vary to provide the optimum transfer or conduction of heat to the casting from the heating element interposed between the castings and from the cooking unit to a utensil thereon.

The second step involves coating the entire surface of one of the plates including the groove therein with a high temperature stainless brazing compound (approximately 71% Ni, 16% Cr, 4% Si, 3¾% B and 4% Fe), such as Nicrobraze, which is sold by the Wall-Colmonoy Company of Detroit, Michigan. This brazing compound comes in a powdered form which may be sprinkled dry onto the surface of the plate and the grooves. It is also suitable for coating the surfaces to be bonded by being hot-sprayed or flame-sprayed to the desired thickness on the plate. During flame-spraying, the brazing powder becomes molten droplets which solidify upon hitting the plate prior to a subsequent brazing or fusing operation.

Assuming that the upper plate 24 is selected for the second step, the third step will encompass the laying or placement of heater 12 in the brazing compound coated groove 34 of the inverted upper plate 24. As aforesaid, the groove 34 closely lies in juxtaposition to the cylindrical or tubular shape of the element 12. Next, the exposed half of the heating element 12 is coated with the brazing compound to ensure that the heating element 12 will be completely bonded to the grooves 34 and 32 of both the top and bottom castings. Although the practice of this invention is believed to require a complete coating of brazing compound on the surfaces to be bonded, it is recognized that the brazing of the exposed surface of the heating element 12 after it is placed in the first groove 34 might not be necessary due to the sweating action or capillary attraction which will occur in the furnace during the brazing or fusing operation of the plates 24 and 26 to each other and to the interposed heating element 12.

At this point, it bears emphasizing that the improved configuration of the applicant's solid plate heater, improves markedly over the arrangement in the prior art whereby a tubular heating element is simply attached to a single solid plate or casting. In this prior art situation, it is necessary to flatten one side of the heating element 12 in order to secure enough contact surface for a satisfactory bond, i.e. a surface which is also sufficiently large to transfer the heat effectively from the heating element to the solid plate during cooking operations. However, in the improved cooking unit of this invention, the utilization of a round or cylindrical cooking tube places approximately fifty percent of the element in contact with each of the top and bottom plates. The element 12 is completely surrounded by the metal of the cooking unit 10. This metal rapidly dissipates the heat generated by the element 12. This characteristic permits the heating element to operate at cooler temperatures than the prior art devices where the tubular element is simply attached at one point, the remainder being exposed in the less heat conductive surrounding atmosphere. No flattening is necessary in the instant article and, thus, the entire manufacturing thereof is simplified in addition to the fact that a superior heat transfer results between the heating element and the solid plates.

After the upper plate 24 and the lower plate 26 are placed in sandwiched relationship to the heating element 12, and after the brazing compound has completely covered the surfaces to be bonded, the assembly is ready for a fusing operation. For this purpose, a controlled atmosphere furnace is most satisfactory for the brazing operation. More particularly, a dry hydrogen furnace operating at temperatures between 1900° F. and 2150° F. may be used to receive the assembly. In the furnace a complete fusing will result wherein the heating element 12 is bonded completely to the grooves 32 and 34 and the plates 24 and 26 one to the other along their mating surfaces. It should be noted, however, that the novel configuration of the applicant's cooking unit assembly permits the use of a normal atmosphere furnace since the sandwiched relationship of the assembly necessarily excludes oxygen during brazing. It is imperative that oxidation be prevented if a complete and thorough bond is to occur between the components during the fusing process. A complete bond, it should be emphasized, between the plates and between the heating element and the plates is absolutely necessary in order to prevent the heating element from burning out during subsequent cooking operation.

Lastly, after the furnace brazing operation, the exterior surfaces of a completed cast iron assembly may be subjected to a protective coating such as a flame spray coating of aluminum or Nicrobraze. However, it is believed to enhance the simplicity of the manufacture if the plates 24 and 26 are plated after their casting or formation and prior to the bonding or fusing operation. In this way, the early failure of the unit is resisted since exposure of the heating element 12 to high temperatures is minimized and the contamination of heating element dielectric insulation prevented. This plating of the exterior surfaces of a cast iron plate is believed desirable for appearance and to prevent undue corrosion of the exposed surface of the cooking unit.

With in the purview of this invention, note also that the terminal ends 14 and 16 of the solid plate heater 10 may project directly radially outwardly rather than offsetting downwardly the entire heating element 12 laying in a single plane. In such an arrangement, the cooking unit 10 is made reversible and adapted to be simply plugged into a receptacle at the side of the range opening. This permits the simple removal of the solid plate heater from the range and the transfer thereof to the sink for cleaning the unit. Then, too, as one surface of the heater 10 becomes worn, the unit can be reversed and the appearance life of the product doubled. Still further, a reversible application could encompass a top and bottom surface having different characteristics, such as a top surface plated in a light or bright color and a lower surface in a darker color.

It should now be seen that an improved cooking unit has been taught wherein a non-interrupted flat surface construction is utilized to provide even heat distribution. The spirally formed or sheathed tubular heating element of the prior art does not have such heat distribution in view of the point contact of the heating element convolutions with the cooking utensil. In the instant arrangement, the radiation downwardly is minimized, the contact with a pan or utensil on the top surface of the cooking unit serving as the easiest course for the heat conduction. The sandwiched relationship effects a durable cooking unit, smooth on both top and bottom surfaces and thereby easily cleaned. Since the unit 10 is formed of castings, the mass of the unit is considerable and this fact tends to minimize warpage of the unit during operation at relatively high temperatures. The fact that the castings or plate members are formed completely separate from the heating element 12 and prior to the fusing of the components enhances the life of the heating element 12 and further adds to the overall durability of this solid plate cooking unit.

While the embodiments of the invention as herein disclosed constitute preferred forms, it is to be understood that other forms might be adopted.

What is claimed is as follows:

1. The method of forming a solid plate heater comprising the steps of, forming a first metal plate having a groove on one surface thereof, forming a second metal plate having a groove complementary to said first plate groove, coating the grooved side of one of said plates with a high temperature brazing compound, placing a tubular sheathed heating element in the groove of one of said plates, coating the sheath of said heating element outside the groove of said one of said plates with said brazing compound, placing the other of said plates in sandwiched relationship to said one of said plates and said element to form a sandwiched assembly excluding oxygen from the interior thereof, and completely and coextensively bonding the sheath of said heating element to said first and second plates and the plates to each other by firing said assembly in a furnace at temperatures sufficient to cause said brazing compound to fuse said first and second plates and said element together.

2. The method of forming a solid plate cooking unit comprising the steps of, casting a first metal plate of cast iron having a groove of curved path on one surface thereof, casting a second metal plate of cast iron having the same coefficient of thermal expansion as the cast iron in said first metal plate and having a groove complementary to said first plate groove and a notched portion along the outer periphery thereof, coating the grooved side of said first plate with a high temperature brazing compound, placing a cylindrical tubular sheathed heating element in said first plate groove in a manner to expose a terminal end thereof beyond said first plate, coating the sheath of said heating element outside of said first plate groove with said brazing compound, placing said second plate in sandwiched relationship to said first plate and said element while positioning said terminal end in said notch to form an assembly, firing said assembly in a furnace at temperatures ranging between 1900° F. and 2150° F. completely bonding metallurgically said first and second plates and said element, and then flame-spraying a brazing compound which is non-corrosive in normal service on the exterior of said first and second plates to protectively coat the exposed surface of said cooking unit to prevent corrosion thereof.

3. The method of forming a solid plate heater comprising the steps of, forming a first metal plate having a groove of curved path on one surface thereof, forming a second metal plate having a groove complementary to said first plate groove, coating the grooved side of one of said plates with a high temperature brazing compound, placing a tubular sheathed heating element in the groove of one of said plates, coating the sheath of said heating element outside the grove of said one of said plates with said brazing compound, placing the other of said plates in sandwiched relationship to said one of said plates and said element to form a sandwiched assembly excluding oxygen from the interior thereof, completely and coextensively bonding the sheath of said heating element to said first and second plates and the plates to each other by firing said assembly in a furnace at temperatures sufficient to cause said brazing compound to fuse said first and second plates and said element together and protectively plating the exterior of said assembly with a brazing compound which is non-corrosive in normal service to prevent corrosion of the exposed surfaces of said solid plate heater and to enhance the appearance thereof.

References Cited by the Examiner

UNITED STATES PATENTS

| 2,483,934 | 10/49 | Richardson | 29—463 |
| 2,851,572 | 9/56 | Steck | 29—155.5 |

FOREIGN PATENTS 964,080  5/57  Germany.

WHITMORE A. WILTZ, *Primary Examiner.*

JOHN F. CAMPBELL, *Examiner.*